Patented Nov. 15, 1938

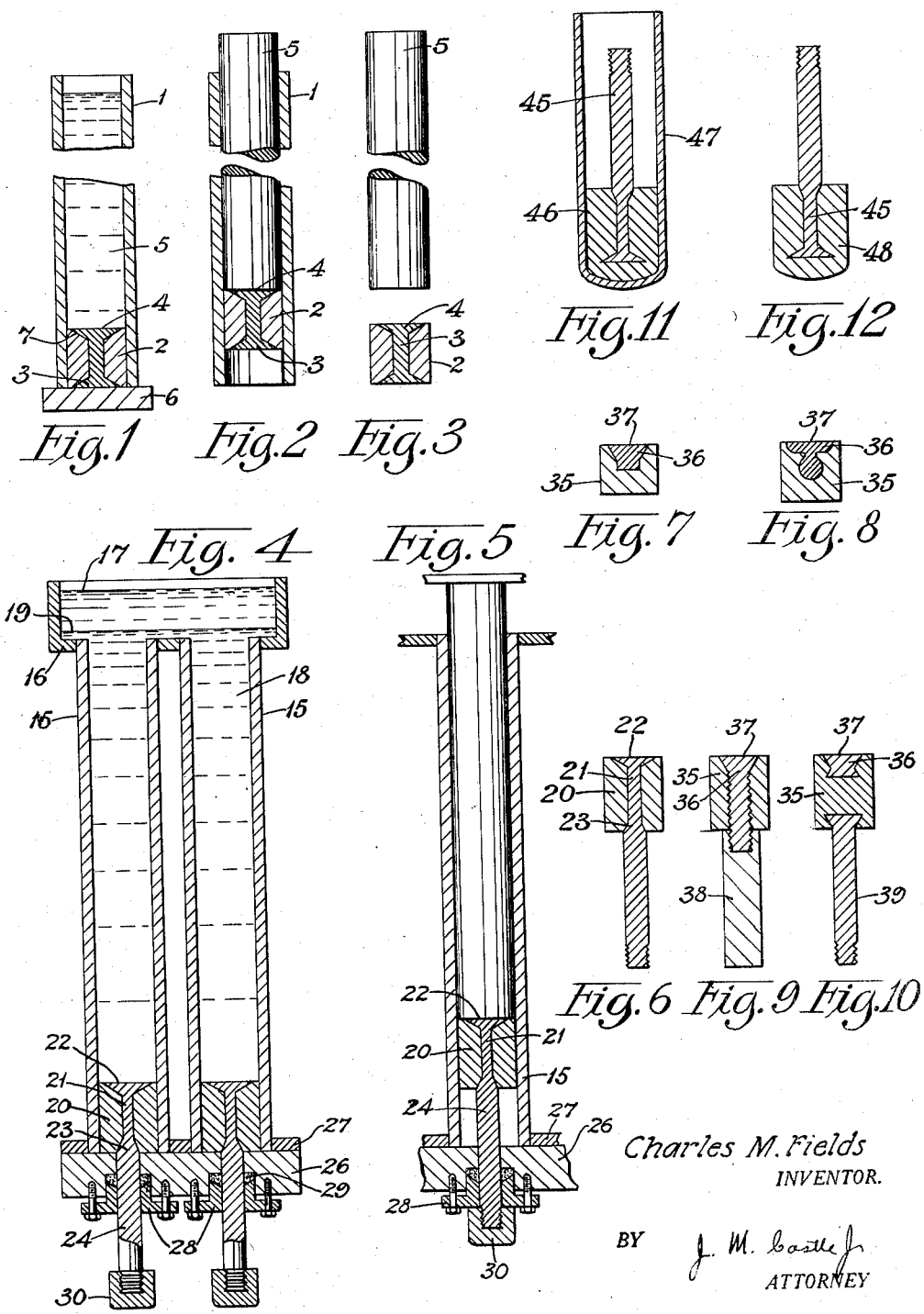

2,136,425

UNITED STATES PATENT OFFICE 2,136,425

APPARATUS FOR POLYMERIZATION OF ORGANIC COMPOUNDS

Charles M. Fields, Arlington, N. J., assignor to E. I. du Pont de Nemours & Company, Wilmington, Del., a corporation of Delaware Application January 13, 1938, Serial No. 184,728

7 Claims. (Cl. 18—39)

This invention relates to an apparatus for the polymerization of polymerizable organic compounds and, more particularly, to elongated molds in which such organic compounds are polymerized at elevated temperatures to give solid bodies, and the means for closing the ends of said molds.

The polymerization of liquid compositions comprising monomeric polymerizable organic compounds such as methyl methyacrylate, in elongated molds at elevated temperatures, is known. A method of accomplishing this is disclosed in applicant's United States Patent 2,057,674 entitled "Polymerization process". In general, such polymerization is effected by the application of heat to the polymerizable liquid contained in a metallic mold and, on completion of the polymerization which has converted the liquid composition to a solid body, cooling of the mold effects a differential shrinkage of the polymeric body with respect to the metallic mold which permits removal of the body from even an untapered mold. However, when using a mold with a permanently closed bottom such as disclosed in said U. S. Patent 2,057,674, the removal of the polymer formed is made difficult by the production of a vacuum in the closed end of the mold against which the solid polymer must be drawn. In commercial production this difficulty becomes a serious factor in the economy of the operation.

An object of the present invention is to provide a new and improved apparatus for the polymerization of organic compounds in elongated shapes. A specific object is to provide an improved means of sealing the end of an elongated mold so as to prevent the leakage of the liquid to be polymerized and to facilitate and simplify the removal of solid polymer from the mold. Other objects of the invention will be apparent from the description given hereinafter.

The above objects are accomplished according to the present invention by polymerizing organic compounds at elevated temperatures in an apparatus which comprises the combination of an elongated, open ended, metallic mold and a removable plug in one end of the mold, the plug comprising a mass of polymerized organic compound and a metallic member anchored within said mass and forming a metallic face on the inner end of the plug of slightly less than the full cross section of the plug, the cross section of the plug being such that at the temperature of polymerization the plug seals the mold liquidtight while at room temperature the plug is slidable longitudinally in the mold.

Specific embodiments of the invention are described hereinafter with reference to the accompanying drawing wherein:

Figs. 1, 2, and 3 illustrate, in section, a plug and associated parts according to one specific embodiment of the invention at various stages in making a rod of polymeric organic compound;

Fig. 4 is a vertical section of a multiple mold according to another specific embodiment of the present invention;

Fig. 5 is a fragmentary vertical section of the mold shown in Fig. 4 at a late stage in the making of a rod of polymeric organic compound;

Fig. 6 is a vertical section of one of the plugs shown in Fig. 4;

Figs. 7, 8, 9, and 10 are vertical sections of modified forms of plugs according to the present invention; and Figs. 11 and 12 illustrate, more or less diagrammatically, successive steps in the preparation of a plug such as shown in Fig. 6.

Referring to Figs. 1, 2, and 3, reference numeral 1 designates a tubular, open-ended metallic mold having its lower end closed by a plug consisting of a cylindrical mass of polymeric organic compound 2 and the metallic insert 3 anchored therein. The insert 3 forms the metallic face 4 on the inner end of the plug. This face 4 has a radius of 0.005–0.030" less than that of the cylindrical mass 2 which, in turn, has a radius a few thousandths of an inch less than that of the cavity of the mold 1 when both are at room temperature.

Fig. 1 shows the plug in position in the mold 1 which is filled with a polymerizable organic liquid 5. The end of the mold 1 and the plug abut against a stop 6 which holds the plug in position against pressure exerted upon the liquid 5 during its polymerization. While the mold 1 and the plug are maintained at the temperature required for polymerizing the liquid 5, the plug, having been properly dimensioned for the purpose, makes a close and liquid-tight fit within the mold 1 and thus prevents leakage of the liquid 5 despite the pressure applied thereto during polymerization. A normal temperature for polymerization would be about 75–80° C.

When polymerization has been completed, the mold and contents are chilled. The difference in coefficient of thermal expansion between the metal of the tube 1 (e. g., aluminum, $20 \times 10^{-6}$ per ° C.) and the polymer within it (polymerized methyl methacrylate $70$–$90 \times 10^{-6}$ per ° C.) causes the plug and rod to become loose within the mold 1 so that they may be readily pushed out of it as indicated in Fig. 2.

After removal from the mold 1, the liquid 5, by now converted into a solid rod of polymer 5, and the plug are readily separated, as indicated in Fig. 3, because the rod 5 of polymer adheres feebly, if at all, to the metallic face 4 of the plug while the thin web of polymer connecting the polymer 2 of the plug with the polymer of the rod 5, around the periphery of the metallic face 4, is readily broken. The thickness of this web, corresponding to the difference in radius between the plug 2 and the face 4 of the metal insert 3, is exaggerated in the drawing for purpose of illustration. The end of the rod 5 requires no further finishing and the plug is ready for re-use, being simply reinserted, while still cold, into the mold 1.

The functioning of the plug depends upon the fact that a large part (preferably, not less than half,) of the diameter of the plug, throughout the greater part of its length, is composed of polymeric resin which, like the polymer in the tube above it, shrinks upon being chilled sufficiently to move freely within the tube. Since there is no appreciable difference in coefficient of thermal expansion between the metal of the face 4 and the metal of the mold 1, the beveling back of the metal insert 3 from the full diameter of its upper face 4 is begun as closely as is consistent with the avoidance of undue weakening at the point of the bevel 7. The functioning of the plug depends also upon the face that its metal face 4 does not adhere appreciably to the polymer in the mold.

The dimensions given above with respect to the plug of polymer and the interior cross section of the mold 1, while giving sufficient clearance to allow moving of the plug within the mold 1, when cold, does not give great enough clearance, even when the plug and mold are cold, to permit leakage of the polymerizable liquid which is ordinarily of a syrupy or viscous character. The pressure applied to the polymerizable liquid during polymerization, which pressure would cause leakage of the liquid through the clearance between the plug and the wall of the mold, when both are cold, is not applied until after the equipment has been heated when the clearace has disappeared because of the difference in coefficient of thermal expansion between the resin of the plug and the metal of the mold.

In large scale commercial production it is desirable to use a modified form of the plug in which the metal insert or member, in addition to forming the metal face in contact with the liquid undergoing polymerization, forms a stem or shaft projecting from the opposite end of the plug, by means of which stem or shaft the plug is adapted to be used as an ejector. This embodiment of the invention will be described below in connection with a multiple mold.

A multiple mold is indicated diagrammatically in Fig. 4 which shows only two tubular mold cavities whereas in actual commercial molds as many as one hundred, or more, mold cavities may be used. Referring to Fig. 4, the lengths of metal tubing 15, 15, conveniently of aluminum, form the molds proper and are secured in a header member 16. This header member 16 serves as a structural member to hold the upper ends of the molds 15, 15 in position; further, it constitutes a reservoir for monomeric liquid which not only simplifies the filling of the individual molds with such liquid but also maintains a reserve supply of unpolymerized liquid which keeps the mold cavities full at all times throughout the process of polymerization despite the shrinkage in volume which accompanies such polymerization; still further, this header member 16 provides a convenient means for applying pressure upon the material during polymerization in the molds 15, 15 by the simple application of gaseous pressure, through means not shown in the drawing, to the free surface 17 of the liquid 18 which is being polymerized.

Because of the shrinkage accompanying polymerization and the provision made for neutralizing this in order to prevent the formation of voids, by effecting polymerization from the bottom of the mold upward, with flowable monomer always available above the level of active polymerization to flow down and compensate for shrinkage, the free level of the liquid 18 in the header member 16 drops, during the course of polymerization, from its initial position 17 to a final position 19. The completion of the polymerization of the polymerizable organic compound in the molds 15, 15 results also ultimately in the substantial polymerization of the reserve material still remaining in the header member 16, which latter material thus constitutes a web connecting the upper ends of the rods formed in the molds 15, 15.

Because it is not desirable to calculate the initial load of unpolymerized organic compound so closely as to eliminate the formation of this connecting web of polymer, which represents an excess of material provided as a factor of safety to insure the filling of all of the tubes, and because the web of polymer cannot well be broken in the mold without damage to the rods formed, it is necessary to provide for the removal of the system of connected rods vertically upward rather than downward.

To seal the open ends of the molds 15 during polymerization and to effect the ejection of the finished polymer from the molds, plugs of the modified form, shown separately in Fig. 6 and in operating positions in Figs. 4 and 5, are used. Each plug comprises a cylindrical block 20 of polymer in which is embedded a metal member 21. As in the case of the plug first described herein, this plug is formed with the metal member 21 providing a metal face 22 on the inner end of the plug, said face 22 being slightly less than the full cross sectional size of the interior of the mold 15, the ratio of the radius of the metal face 21, the cylindrical block 20 of polymer, and the interior of the mold 15 being the same as described above with respect to the plug shown in Figs. 1, 2, and 3.

Below the metal face 22 the metal member or insert 21 is beveled down to a much smaller diameter as it passes through the cylindrical block 20 of polymer and then the metal member 21 is increased in diameter slightly, as at 23 before emerging from the cylindrical block 20 in the form of a stem 24.

The stem 24 of each plug passes through and is supported by the sealing plate 26 which is held closely against a lower header plate 27 in which are secured the lower ends of the molds 15, 15. The holes in the sealing plate 26 through which the stems 24, 24 of the plugs pass, are in register with the cavities of the molds 15, 15 and are of a diameter to accommodate the stems 24, 24 with a sliding fit. These holes are bored out at their lower ends and accommodate stuffing glands 28 which may be drawn up against the ring packing 29 to prevent the leakage of water or other heating and chilling liquid, past the stems 24, 24. Threadably mounted on the lower end of each stem 24 is a knob 30 of large enough diameter so that, when the plug is moved vertically, the knob 30 abuts against the stuffing gland 28 thereby limiting the travel of the plug.

With the plugs in their lower position as indicated in Fig. 4, the molds 15, 15 and the header member 16 are filled with monomeric, or substantially monomeric, polymerizable liquid up to the level 17, indicated in Fig. 4. The diameter of the cylindrical mass 20 of polymer of each plug at polymerizing temperature is such that it forms a liquid-tight seal within the mold with which it is associated. Polymerization is effected by heating, e. g., by the method of U. S. Patent 2,057,674, causing a shrinkage of volume down to the level 19 (Fig. 4) which will form the upper surface of a web of polymer connecting the tops of the individual rods of polymer formed in each mold.

Upon completion of the polymerization the whole system is chilled. The difference in coefficient of thermal expansion between the metal of the molds 15, 15 and the polymeric material within the molds results in a greater shrinkage in diameter of the polymer and of the plug than of the mold, so that the former becomes loose within the mold. To release the rods of polymer formed in the molds 15, 15, it is necessary merely to tap upwards upon the knobs 30, 30 so that the plugs rise and raise the rods of polymer out of the mold sufficiently so that they can be gripped from above and withdrawn the rest of the way from the mold. This operation is indicated in Fig. 5 which shows only a single mold 15.

The webs of polymer connecting the cylindrical masses 20 of polymer forming a part of the plugs with the polymer in the molds, around the outside of the metal faces 22, are so thin that they are fractured by the tapping on the knobs 30, 30 or by the abrupt checking of the upward movement of the plugs when the knobs 30, 30 strike the faces of the glands 28.

The simple method of releasing of the rod of polymer from the molds in this type of apparatus, since it leaves no material adhering to the metal surfaces of the molds 15, 15, leaves the latter in clean condition ready for reloading. Prior to reloading, the plugs are pushed or pulled down again to their lowest position, as in Fig. 4.

In Figs. 7, 8, 9, and 10 are illustrated various modifications of the plug in accordance with the present invention. In each of these figures the mass of resin is designated by the reference numeral 35, the metal insert or member by 36, and the metal face by 37.

Figs. 7 and 8 show plugs in which the metal insert 36 does not extend through the mass of resin 35.

Fig. 9 shows a stemmed plug somewhat similar to that illustrated in Figs. 4, 5, and 6 except that the metal insert 36 is threaded and a stem 38 is mounted thereon. Fig. 10 shows a modified stemmed plug in which a metal insert or member 36 somewhat similar to that used in the plug shown in Fig. 7, is employed together with a metal stem 39 which is mounted in the lower portion of the mass of resin 35.

The length of the plug proper, parallel to the direction of its motion into and out of the mold cavity, must be sufficient to ensure a liquid-tight seal. Assuming careful sizing of the cross-sectional dimensions to form a close fit with the mold when both are at the temperature utilized for polymerization in the mold, the length of the plug need not be normally more than 0.5 inch, but it is ordinarily desirable that the length be not less than the diameter.

As material for the metal member of the plug, it has been found that nickel, stainless steel, brass, bronze, and the commercial alloys known as "Inconel" and "Monel", are satisfactory.

The making of the plug, i. e. the assembly of the polymer and metal member, is conveniently accomplished by immersing the metal member in a suitable volume of monomeric polymerizable liquid and then bringing about the polymerization of the latter into a solid mass of resin in which the metallic member remains embedded. Successive steps of accomplishing this by polymerizing in a test tube, breaking away the test tube from the polymerized resin and machining the latter to the proper dimensions are illustrated diagrammatically in Figs. 11 and 12.

As shown in Fig. 11, the metal member 45 is immersed in monomeric polymerizable liquid 46 in a test tube 47. The liquid is then polymerized to yield the rough block 48 (Fig. 12), which is machined to give the proper size plug.

Although not essential, it is preferable to use the same polymerizable substance in making the plugs, that is to be polymerized in the molds.

The invention has been described in connection with the manufacture of untapered rods of circular cross-section. However, plugs made in accordance with the present invention may be utilized to seal a mold of any shape, provided that the mold comprises an untapered open end in which the plug is placed for sealing and that there is no constriction in the cross-section of the mold, which would prevent ejection of the mass of polymer. Molds of oval, polygonal or irregular cross-sections may be sealed.

While reference has been made to the use of a gas for exerting pressure upon the organic liquid undergoing polymerization in the molds, the plugs of the present invention are likewise adapted where hydrostatic pressure is employed to exert pressure upon the organic liquid.

The present invention provides a simple and economic means for the sealing of open-ended "permanent" molds used for the polymerization of liquid compositions and, in its preferred embodiment, provides also a simple means of ejecting the finished polymer from such molds. The advantage of this preferred embodiment of the invention is that the plugs serve the double purpose of sealing the molds against leakage of monomeric liquid from the molds and of water or other heating liquid into the molds and of functioning as permanent ejector pins, by which the polymer is readily pushed out of the molds. The invention thus simplifies and facilitates the manufacture of "cast" synthetic resins, and effects economies, particularly in their manufacture in the form of untapered rods in multiple molds.

As many apparently widely different embodiments of this invention may be made without departing from the spirit and scope thereof it is to be understood that the invention is not limited to the specific embodiments thereof except as defined in the appended claims.

I claim:
1. An apparatus for polymerization of organic compounds at elevated temperatures which comprises the combination of an elongated, untapered, open-ended metal mold and a removable plug in one end of said mold, said plug comprising a mass of polymerized organic compound of such cross section that at the temperature of polymerization said plug seals said mold liquid-tight while at room temperature said plug is slidable in said mold, and comprising also a metal member anchored within said mass and forming a metal face on the inner end of said plug of slightly less than the full cross section of said plug.

2. An apparatus for polymerization of organic compounds at elevated temperatures which comprises the combination of an elongated, untapered, open-ended metal mold and a removable plug in one end of said mold, said plug comprising a mass of polymerized organic compound of such cross section that at the temperature of polymerization said plug seals said mold liquidtight while at room temperature said plug is slidable in said mold, and comprising also a metal member passing through and anchored within said mass and constituting at the inner end of said plug a metal face of slightly less than the full cross section of said plug and at the other end of said plug a stem projecting therefrom.

3. An apparatus for polymerization of organic compounds at elevated temperatures which comprises the combination of an elongated, untapered, open-ended metal mold and a removable plug in one end of said mold, said plug comprising a mass of polymerized organic compound of such cross section that at the temperature of polymerization said plug seals said mold liquidtight while at room temperature said plug is slidable in said mold, and comprising also a metal member passing through and anchored within said mass and constituting at the inner end of said plug a metal face of slightly less than the full cross section of said plug and at the other end of said plug a stem projecting therefrom, the metal member being of substantially smaller cross section than the mass of polymerized organic compound throughout most of that part of said metal insert's length enclosed in said mass.

4. An apparatus for polymerization of organic compounds at elevated temperatures which comprises the combination of an elongated, untapered, open-ended metal mold, a sealing plate abutting against one end of said mold and provided with an opening in register with the cavity of said mold and of smaller cross section than said cavity, a plug in said end of said mold, said plug having a stem portion passing through and extending beyond said opening in said sealing plate, and a knob mounted on the outer end of said stem.

5. An apparatus for polymerization of organic compounds at elevated temperatures which comprises the combination of a plurality of elongated metal molds, each of said molds having an untapered open end and being designed to permit a mass of organic compound polymerized therein to be ejected out of the opposite end thereof, a sealing plate abutting against said untapered open ends of said plurality of molds and provided with a plurality of openings, each of said openings being in register with the cavity of one of said molds abutting against said sealing plate and having a smaller cross section than said cavity, a plug in said untapered open end of each mold, said plug having a stem portion passing through and extending beyond the opening in said sealing plate in register with the cavity of the mold in which said plug is deposited, and a knob mounted on the outer end of said stem.

6. An apparatus for polymerization of organic compounds at elevated temperatures which comprises the combination of an elongated mold having an untapered open end and being designed to permit a mass of organic compound polymerized in said mold to be ejected out of the opposite end thereof, a sealing plate abutting against one end of said mold and provided with an opening in register with the cavity of said mold and of smaller cross section than said cavity, a plug in said end of said mold, said plug comprising a mass of polymerized organic compound of such cross section that at the temperature of polymerization said plug seals said mold liquidtight while at room temperature said plug is slidable in said mold, and comprising also a metal member passing through and anchored within said mass and constituting at the inner end of said plug a metal face of slightly less than the full cross section of said plug and at the other end of said plug a stem projecting therefrom, said stem passing through and extending beyond said opening in said sealing plate, and a knob mounted on the outer end of said stem.

7. An apparatus for polymerization of organic compounds at elevated temperatures which comprises the combination of an elongated metal mold having an untapered open end and being designed to permit a mass of organic compound polymerized in said mold to be ejected out of the opposite end thereof, and a removable plug in said untapered open end of said mold, said plug comprising a mass of polymerized organic compound of such cross section that at the temperature of polymerization said plug seals said mold liquidtight while at room temperature said plug is slidable in said mold, and comprising also a metal member anchored within said mass and forming a metal face on the inner end of said plug of slightly less than the full cross section of said plug.

CHARLES M. FIELDS.